(12) United States Patent
Young

(10) Patent No.: US 6,209,669 B1
(45) Date of Patent: Apr. 3, 2001

(54) TRACK FRAME AND SUSPENSION FOR SUGAR CANE HARVESTER

(75) Inventor: Douglas James Young, Bundagerg (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/436,327

(22) Filed: Nov. 8, 1999

(51) Int. Cl.[7] ................................................ B62D 55/084
(52) U.S. Cl. ............................................ 180/9.52; 180/41
(58) Field of Search ........................ 180/9.1, 9.5, 9.52, 180/41, 9.46; 305/120, 121, 122, 123; 280/5.28, 5.507

(56) References Cited

U.S. PATENT DOCUMENTS 3,900,077 * 8/1975 Gee et al. ............................ 180/9.46
4,683,970 * 8/1987 Smith ..................................... 180/15
5,353,988 * 10/1994 Gallenberg ........................... 239/164

FOREIGN PATENT DOCUMENTS 574871   7/1988 (AU) .

* cited by examiner

*Primary Examiner*—Kevin Hurley

(57) ABSTRACT

A sugar cane harvester for harvesting two rows of cane stalks is equipped with a pair of endless track assemblies which each include a track frame suspended from the main frame of the harvester by a four-point suspension including tilt and elevation cylinders that permit side-to-side tilting, and elevation adjustments of the harvester main frame so as to place base cutters at the best attitude for cutting cane contained in the rows, even if the rows are at different elevations.

26 Claims, 3 Drawing Sheets

TRACK FRAME AND SUSPENSION FOR SUGAR CANE HARVESTER

BACKGROUND OF THE INVENTION

The present invention relates to tracked sugar cane harvesters and more particularly relates to a track frame and suspension for a two-row cane harvester.

It is known to equip a sugar cane harvester with track laying track assemblies for operation in soft or wet fields for floatation and so that undue compaction does not occur.

These track assemblies each include a track frames having a cross member extending between a rear portion of the tacks and mounted to a main support frame for tilting about a fore-and-aft axis located midway between the tracks. A pair of tilt cylinders are located at opposite sides of the vehicle and act between the main frame and the cross member so as to place the vehicle main support frame in various selected tilted attitudes relative to the track frames in order to compensate for sloping ground, for rows of cane of different heights and for situations where the cane stalks in one row may be bent over. The track frame cross member which contains the fore-and-aft pivot connection with the main frame also contains a horizontal transverse pivot axis structure about which the tracks are vertically pivotable for adjusting the elevation of the forward part of the main frame, and hence the height of the base cutters carried on the forward part of the main frame, relative to the tracks, this adjustment being done by a pair of elevation cylinders respectively located at opposite sides of the vehicle and mounted between the main frame and respective forward portions of the track frames. The part of the track frame to which the elevation cylinders are attached is a frame portion which straddles the top of the tracks themselves. An example of such a track frame assembly is disclosed in Australian Patent No. 574,871 granted to Paul Mizzi on Jul. 14, 1988.

This known track frame design is relatively heavy and the part that straddles the top of the track has a tendency to cause mud and debris to accumulate where the part passes over the tracks.

SUMMARY OF THE INVENTION

According to the present invention there is provided an improved track frame and suspension for a sugar cane harvester.

An object of the invention is to provide a track-supported sugar cane harvester having suspended track frames of a simple, light-weight design.

A more specific object of the invention is to provide track frames which are each coupled to the main vehicle frame by a ball joint permitting tilting and vertical adjustments of the track frame and to provide tilt and elevation cylinders which suspend the frame and serve to provide dampening of undercarriage vibrations due to the loads being carried by the hydraulic cylinders.

Yet another object of the invention is to provide a sugar cane harvester as set forth in the immediately preceding object wherein there are four points of suspension for each track frame.

A further object of the invention is to provide track frames suspended as set forth in one or more of the previous objects, with the suspension for each frame further including a longitudinally extending control arm that acts to transfer turning forces directly to the main frame of the machine.

Still another object of the invention is to provide a suspended track frame which is constructed so that it does not tend to accumulate mud and debris in the vicinity of the track.

These and other objects will become apparent from a reading of the ensuing description together with the appended drawings.

DESCRIPTION OF THE PREFERRED EMBODIMENT

Figure 1:
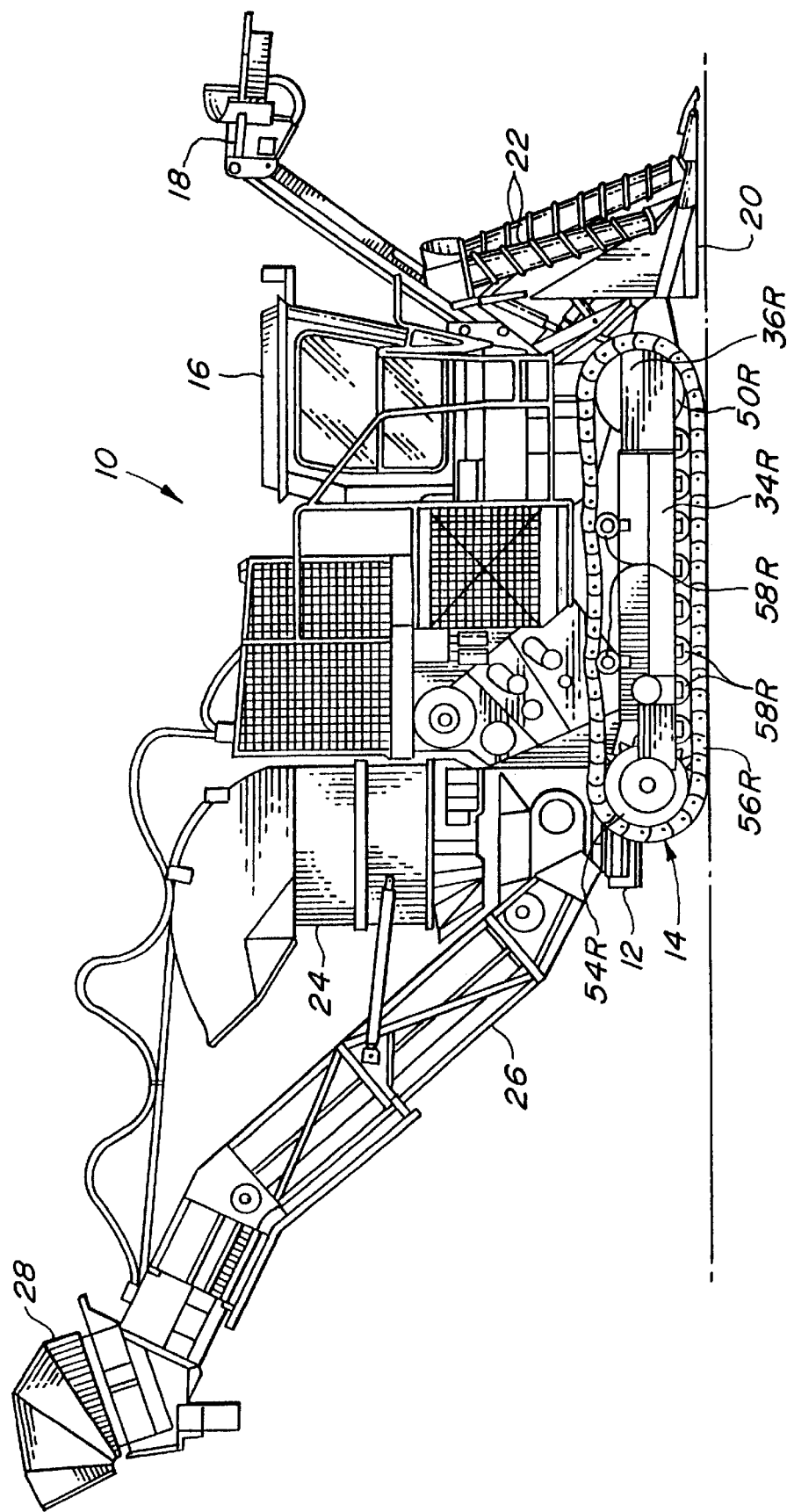
FIG. 1 is a right side elevational view of a track-supported sugar cane harvester of the type with which the present invention is particularly adapted for use.

Referring now to FIG. 1, there is shown a two-row sugar cane harvester 10 including a main frame 12 supported on right-and left-hand track assemblies, with only the right-hand assembly 14 being shown. An operator's cab 16 is mounted on a forward part of the main frame 12 just behind mountings on the frame 12 for, and in a position for observing the operation of, a cane topper 18 and sets of elongate, steeply inclined gathering rolls 20 having spiral lifting elements about their periphery. A base cutter assembly is provided for each row of cane stalks to be cut and comprises a pair of counter-rotating cutter blades (not shown) mounted in at a location beneath a rear portion of the cab 16 for severing the stalks of cane close to the ground and for feeding the cut stalks into a passage defined by upper and lower sets of conveyor rolls of a first conveyor (not shown) that conveys the cut cane stalks between a pair of rotary cutters (not shown) that cut the stalks into lengths or billets. A primary extractor 24 is mounted on a rear portion of the main frame 12 at a location behind the rotary cutters which discharge the billets into the primary extractor 24 which acts to separate leafy trash from the billets, the latter falling into a loading conveyor 26, having its forward end mounted to the main frame 12 for slewing about an upright axis. A secondary extractor 28 is mounted at a rear discharge end of the conveyor 26 and acts to remove any remaining leafy trash from the stream of billets as the billets are deposited into a trailed container (not shown), or the like.

It is a common practice to grow cane in raised rows or ridges. For various reasons the cane stalks in one row may be at a different elevation relative to cane stalks in an adjacent row. It is desirable to have the base cutters for the adjacent rows operate to cut the cane as close to the ground as possible so that the maximum amount of stalk is harvested, especially in view of the fact that the sugar content of the lower part of the stalk is higher than in other parts. Therefore, provision is made for side-to-side tilting of the harvester 10. This is accomplished by the track frame and suspension structure described below.

Figure 2:
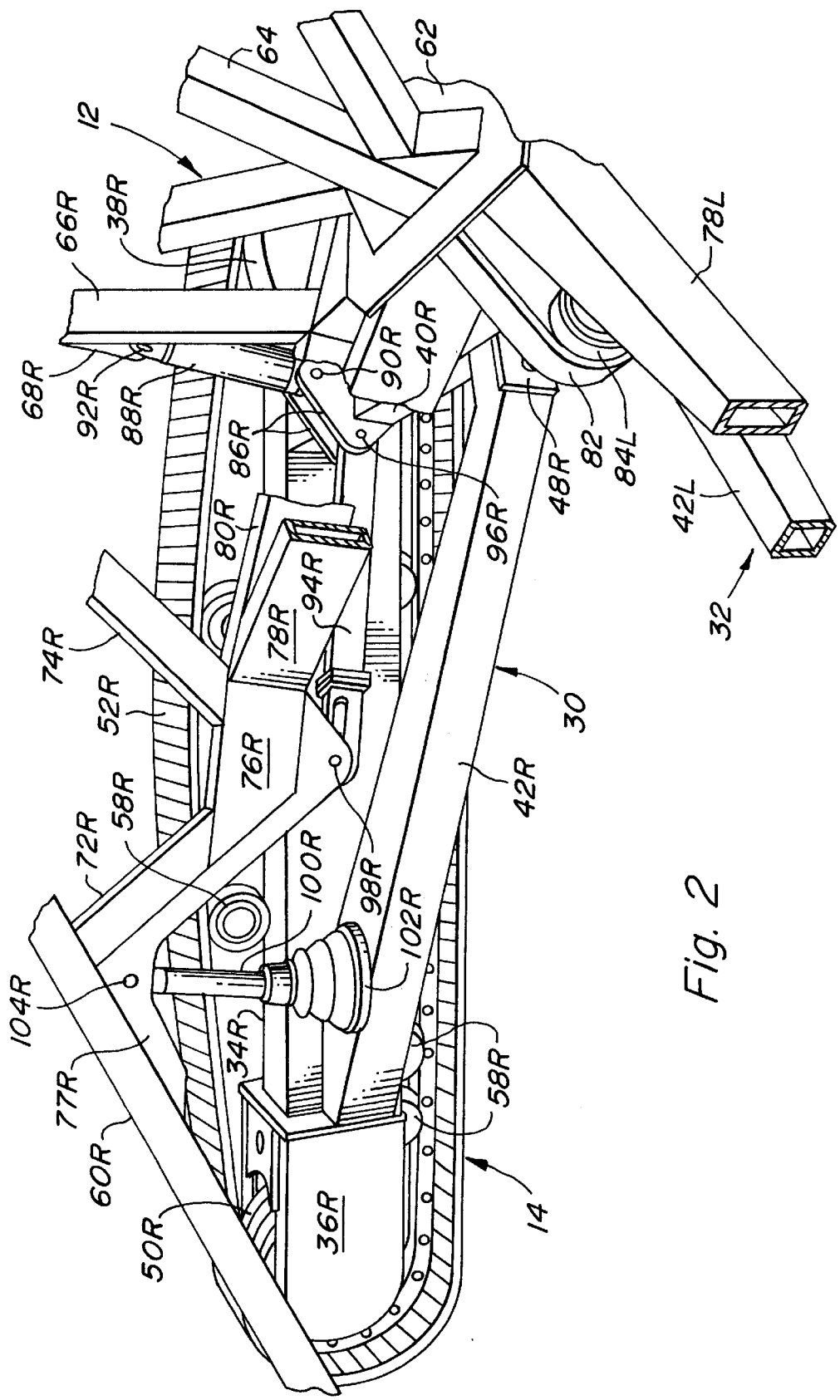
FIG. 2 is a perspective view looking towards the left front of the right-hand track of the sugar cane harvester and showing the four-point connection of the track frame with the main frame of the harvester.
Figure 3:
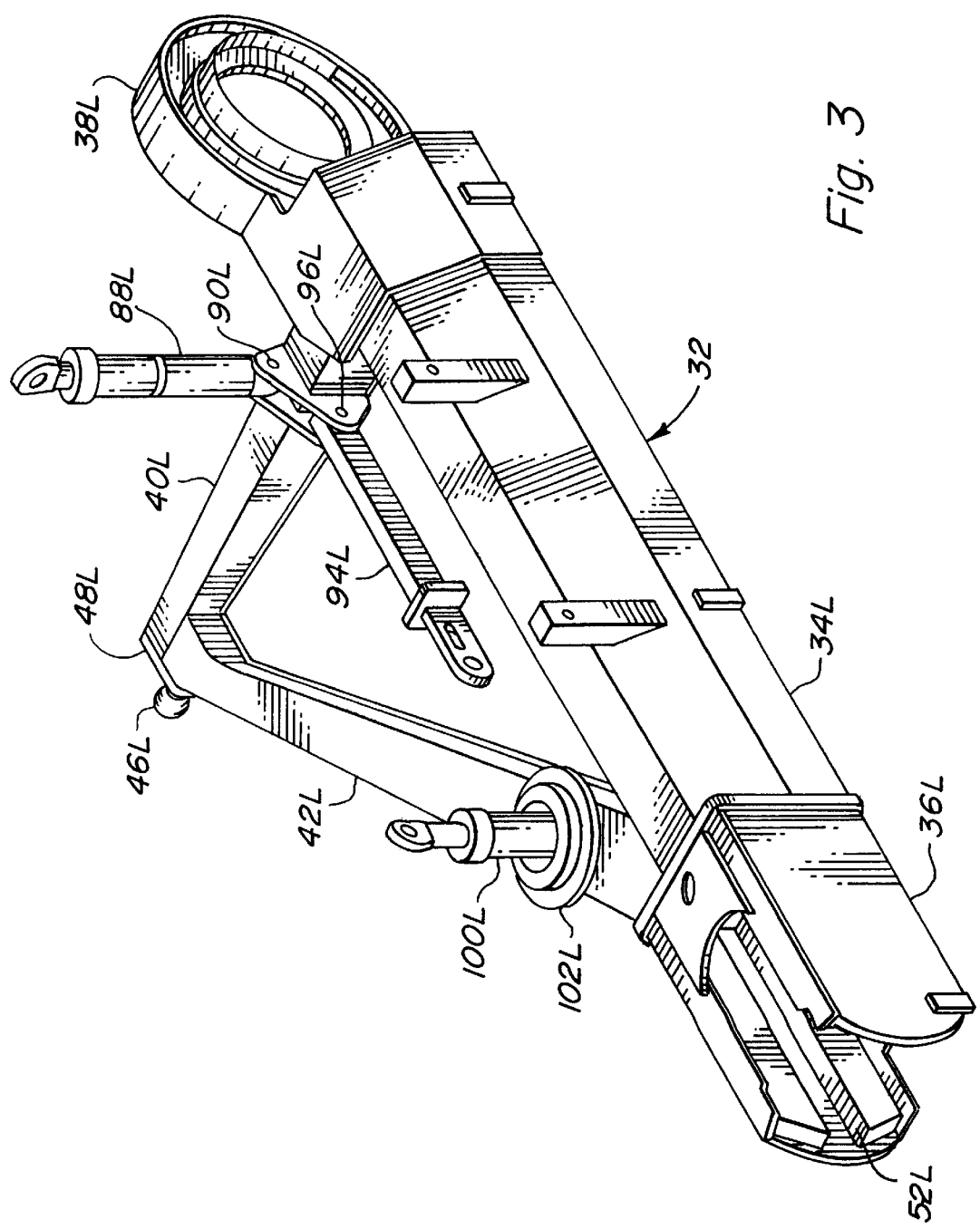
FIG. 3 is a left front perspective view of the left-hand track frame of the sugar cane harvester.

Specifically, referring now to FIG. 2, it can be seen that the right-hand track assembly 14 includes a track frame 30 mounted to the main frame 12 of the cane harvester 10. The left-hand track assembly includes a track frame 32, shown only minimally in FIG. 2 but in its entirety in FIG. 3, is mounted to the frame 12 in a manner similar to the track assembly 14. The right- and left-hand track frames 30 and 32 are mirror images of each other, with like parts being given the same reference numeral followed by an R or an L to differentiate between the opposite sides. For the sake of brevity, only the track assembly 14 and its frame 30 are described in detail with it to be understood that the other track assembly is similar. Further, although only the right-hand track assembly 14 is shown, it is to be understood that absent members of the left-hand track assembly are the same or mirror images of those of the track assembly 14.

The track frame 30 includes a longitudinally extending side member 34R having a front end defined by a yoke or fork 36R and a rear end defined by a ring-like housing 38R. The track frame 30 further includes an A-frame structure projecting inwardly from the side member 34R and defined by a transverse member 40R joined to an inner surface of the side member 34R, at a location just ahead of the ring-like housing 38R, and by a diagonal brace 42R having its front end joined to the frame 30, at the rear of the yoke 36R, and its rear end joined to an inner end of the transverse member 40R. A ball (not visible but see ball 46L in FIG. 3) is welded to a plate 48R that is in turn welded to an inner end of the transverse member 40R and an inner surface of a longitudinally extending rear end portion of the diagonal brace 42R, the ball then projecting inwardly from the plate 48R.

Opposite sides of the yoke 36R are respectively disposed on opposite sides of an idler wheel 5OR that is rotatably mounted in a pair of transversely spaced bearing blocks (not shown) mounted for sliding fore-and-aft in a pair of guides (not visible but see one guide 52L visible in FIG. 3) provided at respective inner surfaces of the yoke sides. The housing 38R at the rear of the frame 30 serves to support a right-hand hydrostatic transmission drive motor and planetary final drive gear set (not shown) whose output is coupled to a drive sprocket 54R (FIG. 1) that is aligned with the idler wheel 50R. An endless track 56R extends about the drive sprocket 54R and idler wheel 50R. A plurality of track rollers 58R are mounted to the longitudinal member 34R, with two being shown mounted to the top of the member 34R and engaging a bottom surface of a top run of the track 52R and with the remainder being shown mounted to underside locations of the frame member 34R and engaging a top surface of a bottom run of the track 52R. A track tensioner (not shown) of a well known construction is coupled between the longitudinal member 34R of the frame 30 and the idler wheel 5OR for forcing the wheel against the track 40, but being able to recoil to permit obstacles to pass between the track 56R and the idler wheel 50R or drive sprocket 54R.

The right- and left-hand track frames 30 and 32 are both suspended from underside locations of the main frame 12. With reference to FIG. 2, it can be seen that the main frame 12 includes a longitudinally extending right-hand side rail 60R that is inclined upwardly from front to rear, this side rail being just inwardly of the track 56R. A corresponding left-hand side rail (not shown) is provided just inwardly of the track at the left-hand side of the cane harvester 10. A cross beam, not shown, joins rear portions of the side rails. The main frame 12 includes a horizontal platform 62 located on the longitudinal center of the harvester 10 adjacent and above rear ends of the right- and left-hand track frames 30 and 32, respectively. A centrally located post 64 extends between and has its opposite ends joined to the cross beam and the platform 62. A right-hand side post 66R extends between and has it opposite ends respectively joined to a right-hand forward corner of the platform 62 and the side rail 60R, the post 66R being angled upwardly and outwardly from the platform 62. A support member 68R, in the form of a right triangle, has its hypotenuse fixed to the outer surface of the side post 66R, its base extending horizontally at a level above that of the top of the track 52R and its remaining side located in a first longitudinally extending vertical plane spaced inwardly from a second longitudinal vertical plane containing inner ends of the upper and lower runs of the track 52R, as considered when the latter is resting on a horizontal surface. Fixed to and projecting downwardly from an outer location of the base of the triangular support member 68R is a pair of longitudinally spaced mounting lugs or ears 70R having a purpose explained below. The main frame 12 further includes a front brace 72R having an upper end fixed to the side rail 60R and a rear brace 70R having an upper end joined at the junction of the side post 66R and the side rail 60R, the front and rear braces 72R and 74R converging downwardly and being joined together at a reinforcing member 76R located inwardly from, and about half way between opposite ends of, the track frame member 34R. A pair of transversely spaced plates 77R extend beneath and are fixed to the reinforcing member 76R, the brace 72R and a portion of the side rail 60R leading up to the brace 72R. Converging toward and being joined to each other and to the reinforcing member 76R, at a location adjacent the rear brace 74R, are inner and outer, generally horizontal beam members 78R and 80R which have their rear ends respectively fixed to forward central, and right front locations of the platform 62. A left-hand inner beam member 78L is also partly visible. A mounting lug 82 has a rear end joined to a front, central location of the platform 62 between the rear ends of the inner beam members 78R and 78L and extends downwardly and forwardly from the platform 62 to a location at a level below that of the bottom of the platform 62, and hence, below the bottoms of the beam members extending from the platform.

The track frames 30 and 32 are coupled to the frame 12 in a manner presently described. Specifically, the lower end of the mounting lug 82 is provided at its opposite sides with ball receptacles of which only the left-hand receptacle 84L is shown. The right-hand ball of the track frame 30 is captured for universal movement in the right-hand receptacle while the left-hand ball 46L of the track frame 32 is captured for universal movement in the left-hand receptacle 84L. Spaced a short distance inwardly on the rear transverse member 40R from the longitudinal member 34R and fixed to top and front surfaces of the member 40R are a pair of transversely spaced plates 86R.

An extensible and retractable hydraulic tilt cylinder 88R has a lug at its cylinder end which is received between and pinned to the pair of plates 86R by a transverse pin 90R while a terminus of the rod end of the cylinder 88R is defined by an eye that is located between the mounting lugs 70R and coupled thereto by a longitudinal pin 92R.

A longitudinal control arm or link 94R has a rear end located between and coupled to forwardly projecting portions of the plates 86R by a transverse pin 96R, and has a front end received between the plates 77R, at a location below the reinforcing member 76R, and are coupled to the plates by a transverse pin 98R.

Mounted to the top of the diagonal member 42R of the track frame 30 at a location in longitudinal alignment with the tilt cylinder 88R and control arm 94R is an extensible and retractable hydraulic elevation cylinder 100R. The cylinder 100R has its lower end coupled to the top of the member 42R by a ball joint connection 102R. The upper end of the cylinder 100 is received between the plates 77R, at a location below the junction of the rail 60R and brace 72R, and is coupled to the plates by a transverse pin 104R.

It will be appreciated then that the track frames 30 and 32 are each suspended from the main frame 12 at four points, namely the connection at the ball joint at the inner rear corner of each of the frames (see ball joint 46L of the frame 32), the connection at the top of the tilt cylinder 88R or 88L, the connection at the front end of the control arm 94R or 94L and the connection at the top of the elevation cylinder 100R or 100L. It is here noted that the pins 96R and 96L respectively coupling the control arms 94R and 94L to the track frames 30 and 32 are aligned with the ball joints defined by the balls carried by the frames 30 and 32 and the ball receptacles carried by the main frame member 82 so as to define respective transverse pivot axes about which the track frames 30 and 32 are pivotable in response to extension or retraction of the elevation cylinders 30 and 32. Ideally, the pivot connections of the lower ends of the tilt cylinders 88R and 88L would respectively be on the same axis as the pins 96R and 96L but such would require special clevis ends to be fashioned for the tilt cylinders.

The operation of the suspension of the track assembly 14 shown in FIG. 2 is stated below with it to be understood that the left hand track assembly operates in a similar fashion. If the operator desires to elevate the right-hand side of the cane harvester 10 relative to its left-hand side, the operator will effect extension of the tilt cylinder 88R. This will cause the main frame 12 to pivot upwardly about the ball joint (not shown) that is fixed to the plate 48R. Contraction of the left-hand tilt cylinder 88L will create an even more difference in the elevation of the opposite sides of the frame 12. Tilting the frame 12 in the opposite direction is accomplished by extending the left-hand tilt cylinder 88L and/or contracting the right-hand tilt cylinder 88R.

Raising or lowering of the front of the main frame 12 of the harvester 10 is effected by respectively extending or contracting the elevation cylinders 100R and 100L so as to pivot the frame 22 vertically about the transverse axis defined by the ball joints respectively at the inner rear of the frames 30 and 32 and the pivot pins 96R and 96L. The location of the elevation cylinders 100R and 100L on the diagonal members 42R and 42L allows forces to be applied directly on the longitudinal center of the diagonal members which are supported at their rear ends by the main frame 12. This minimizes twisting loads from being imposed on the diagonal members 42R and 42L and transferred to the longitudinally extending side members 34R and 34L is important since they carry the track rollers 58R that keep the tracks in proper alignment. With the elevation cylinders 100R and 100L so connected to the track frames 30 and 32, no straddle frame over the tracks is required, such straddle frames inherently causing mud build-up problems and increasing the weight and complexity of the track frames.

When the harvester 10 is being turned to the right, loads imposed by the earth on the outer side of the track 52R will be transferred in compression through the control arm 94R to the main frame 12 while loads imposed by the earth on the inner side of the left-hand track will be transferred through the control arm 94L in tension to the main frame 12. Reverse loading of the control arms 94R and 94L will occur during a left-hand turn. While the control arms 94R and 94L are preferably located as disclosed, there are other ways of keeping the track frames 30 and 32 parallel with a longitudinal centerline of the vehicle 10 when side loads are imposed on the tracks. For example, while the plates 86R are here shown projecting forwardly to provide a location for the connection 96R, the geometry of the track frame 30 could be modified slightly by shifting the transverse member 40R forwardly far enough to permit the plates 86R to extend to the rear with the pivot 96R being provided there and still aligned with the ball joint axis. In such a construction, the control arm 94R could be modified so as to extend rearwardly and inwardly from the connection 96R, with the connection 98R then being relocated to a position on platform 62 rearwardly of the ball joint support 82. Another alternative could be to dispense with the control arms 94R and 94L altogether and to perform the controlling function with the elevation cylinders 100R and 100L. In this case, the cylinders 100R and 100L and their end connections would be of a more robust construction so as to withstand side loads imposed on the tracks. Still another possible alternative to using the control arms 94R and 94L would be to provide the main frame 10 with a pair of transversely spaced restraining plates for each track frame that straddle a specially shaped bumper structure forming part of an adjacent track frame, this arrangement permitting the track frames to freely elevate and tilt while having their sideways movement restrained.

The hydraulic actuators 88R, 88L, 100R and 100L serve to carry loads imposed on the track assemblies and thus also serve to dampen vibrations transmitted through the track assemblies. This of course is the preferred embodiment, however, other powered extensible and retractable devices, such as powered screw jacks, for example, could be used instead of hydraulic cylinders. Yet another alternate construction would be to substitute powered crank arms coupled between the main frame 12 and the track frames 30 and 32 at the locations occupied by the cylinders 100R, 100L and 88R, 88L, and arranged to produce a mainly vertical movement of the track frame at its points of connection with the crank arms.

What is claimed is:

1. In a vehicle having a main frame, right- and left-hand, ground engaging track assemblies suspended from said main frame and each track assembly including an endless track extending about a drive sprocket and an idler wheel, with the sprocket and idler wheel being supported at opposite ends of a longitudinal side member of the associated track frame, the improvement comprising: each track frame including an inner surface spaced transversely from a location of the side frame that is adjacent the drive sprocket; a first universal coupler connecting said inner surface to said main frame; a powered tilt means located outwardly of said first universal coupler and coupled between said track frame and said main frame and being selectively operable for tilting said track frame about said universal coupler; and a powered elevation means located forwardly of said first universal coupler and coupled between said main frame and track frame and being selectively operable for raising or lowering said main frame relative to said track frame.

2. The vehicle defined in claim 1 and further including a control means coupled between said main frame and each track frame for maintaining said side frame parallel to a longitudinal center line of said vehicle during turning or any other operation which places side loads on said tracks.

3. The vehicle defined in claim 2 wherein said control means includes a control arm having its opposite ends respectively pivotally attached to said main frame and track frame.

4. The vehicle defined in claim 3 wherein the pivotal attachment of the control arm to said track frame defines a transverse pivot axis which passes through said first universal coupler and about which said track frame pivots in response to operation of said elevation means.

5. The vehicle defined in claim 4 wherein said control arm extends forwardly from said transverse pivot axis.

6. The vehicle defined in claim 5 wherein said control arm is disposed substantially parallel to said side member.

7. The vehicle defined in claim 1 wherein said powered tilt means is coupled between said main frame and track frame at a location between said first universal coupler and said side member.

8. The vehicle defined in claim 1 wherein said powered tilt means includes a first extensible and retractable member having upper and lower ends respectively pivotally coupled to said main frame and track frame.

9. The vehicle defined in claim 8 wherein said first extensible and retractable member is a hydraulic tilt cylinder.

10. The vehicle defined in claim 1 wherein said powered elevation means includes a second extensible and retractable member having upper and lower ends respectively pivotally coupled to said main frame and track frame.

11. The vehicle defined in claim 10 wherein said lower end of said second extensible and retractable member is coupled to said track frame by a second universal coupler.

12. The vehicle defined in claim 10 wherein said second extensible and retractable member is a hydraulic elevation cylinder.

13. The vehicle defined in claim 1 wherein said elevation means is coupled between said main frame and track frame at a location inwardly of said side member.

14. The vehicle defined in claim 1 wherein said track frame is defined solely by said side member, a diagonal member extending inwardly and rearwardly from a forward location of said side member to said first universal coupler and a transverse member extending inwardly from a rearward location of said side member to said first universal coupler.

15. The vehicle defined in claim 14 wherein said tilt means is coupled to said transverse member and said elevation means is coupled to said diagonal member.

16. The vehicle defined in claim 15 wherein said tilt means is a hydraulic tilt cylinder having its upper and lower ends respectively pivotally coupled to said main frame and to said transverse member.

17. The vehicle defined in claim 15 wherein said elevation means is a hydraulic elevation cylinder having its upper and lower ends respectively pivotally coupled to said main frame and to said diagonal member.

18. The vehicle defined in claim 17 wherein said lower end of said elevation cylinder is connected to said diagonal member by a second universal coupler.

19. The vehicle defined in claim 11 wherein the tilt means and elevation means respectively include a hydraulic tilt cylinder and a hydraulic elevation cylinder, with said tilt cylinder having its upper and lower ends respectively pivotally coupled to said main frame and said transverse member, and with said elevation cylinder having its upper and lower ends respectively coupled to said main frame and said diagonal member; and said tilt and elevation cylinders being approximately in longitudinal alignment with each other at respective locations spaced a short distance inwardly of said side member.

20. The vehicle defined in claim 11 wherein said first and second universal couplers are first and second ball joints, respectively, formed by respective balls carried by one of said main frame and track frame and respective ball receptacles carried by the other of said main frame and track frame.

21. The vehicle defined in claim 20 wherein said first ball joint includes a first ball fixed to said track frame and a receptacle fixed to said main frame.

22. The vehicle defined in claim 20 wherein said second ball joint includes a second ball fixed to a lower end of said elevation cylinder and a second ball receptacle fixed to said track frame.

23. The vehicle defined in claim 1 wherein each track frame includes a transverse member having its outer end fixed to an inner side of said side member at a location just forwardly of said drive sprocket and a diagonal member having an outer end fixed to said side frame at a location just rearwardly of said idler wheel and a rear end fixed to an outer end portion of said transverse member; and said universal coupler being mounted to said track frame substantially at a location where said transverse and diagonal members are joined to each other.

24. The vehicle defined in claim 23 wherein said track frame is formed solely of said side member, transverse member and diagonal member.

25. The vehicle defined in claim 1 and further including a control arm having opposite ends respectively pivotally connected to said main frame and to said track frame, with the pivotal connection of said control arm with said track frame being so located that it cooperates with said universal connector so as to define a pivot axis about which the track frame pivots in response to operation of said elevation means.

26. The vehicle defined in claim 1 wherein the respective pivotal connections of the lower ends of said tilt and elevation means with said track frame are spaced substantially equally inwardly from the track frame side member.

* * * * *